United States Patent [19]

Nakajima et al.

[11] Patent Number: 5,702,125
[45] Date of Patent: Dec. 30, 1997

[54] ARRANGEMENT OF DISPOSITION OF CANISTER IN VEHICLE

[75] Inventors: Takeaki Nakajima; Kazumi Yamazaki, both of Saitama, Japan

[73] Assignee: Honda Giken Kogyo Kabushiki Kaisha, Tokyo, Japan

[21] Appl. No.: 517,335

[22] Filed: Aug. 21, 1995

[30] Foreign Application Priority Data

Aug. 17, 1994 [JP] Japan .................... 6-193208

[51] Int. Cl.⁶ .................................... B60K 15/07
[52] U.S. Cl. .................................... 280/834
[58] Field of Search ............... 280/830, 7, 831, 280/832, 833, 834

[56] References Cited

U.S. PATENT DOCUMENTS

| | | | |
|---|---|---|---|
| 4,109,687 | 8/1978 | King | 280/834 X |
| 4,550,923 | 11/1985 | Ogawa et al. | 280/834 |
| 4,787,643 | 11/1988 | Shirata | 280/834 |
| 4,793,839 | 12/1988 | Hayashida et al. | 280/834 X |
| 4,805,581 | 2/1989 | Yamada et al. | 280/834 X |
| 5,111,900 | 5/1992 | Leitermann | 280/834 X |
| 5,195,780 | 3/1993 | Inoue et al. | 280/834 |
| 5,405,167 | 4/1995 | Lee | 280/834 X |
| 5,409,264 | 4/1995 | Nakatani | 280/834 |
| 5,445,351 | 8/1995 | Foster | 280/834 X |
| 5,560,651 | 10/1996 | Kami et al. | 280/834 X |

Primary Examiner—Kevin Hurley
Attorney, Agent, or Firm—Weiner, Carrier, Burt & Esser, P.C.; Joseph P. Carrier; Irving M. Weiner

[57] ABSTRACT

A rear panel is provided in rear of a connecting wall rising upwardly from a rear end of a front floor panel, and a fuel tank supported within a subframe is disposed beneath a lower surface of the rear floor panel. A gas fume absorbing canister and a muffler are juxtaposed in a lateral direction of a vehicle body in a space which is surrounded by a rear surface of a middle cross-member secured to a rear surface of the connecting wall, a front surface of the fuel tank and the lower surface of the rear floor panel. Thus, it is possible to shorten a purge passage connected from the canister to an engine, to protect the canister from collision against a stepping stone or the like, to insure the volume of a trunk room and to enhance the purging efficiency of the canister utilizing a heat of the muffler by reasonably disposing the canister at a rear portion of the vehicle body.

20 Claims, 5 Drawing Sheets

FIG.1

FIG.5

ARRANGEMENT OF DISPOSITION OF CANISTER IN VEHICLE

BACKGROUND OF THE INVENTION

1. Field of the Invention

The present invention relates to an arrangements of disposition of a canister in a vehicle including a rear floor panel connected to a rear portion of a front floor panel through an upwardly rising connecting wall, and a fuel tank supported below the rear floor panel.

2. Description of the Relevant Art

There is a conventionally known canister which is designed such that an evaporated fuel generated within a fuel tank is charged to an absorbent such as activated carbon and prevented from being released to the atmosphere, and the evaporated fuel is purged from the absorbent into an intake system during operation of an engine for burning.

In general, the canister is often disposed in an engine compartment. However, when it is difficult to dispose a canister having a large volume in a narrow engine compartment, the canister is disposed in the vicinity of the fuel tank at a rear portion of a vehicle body. In such a case, a location in back of the fuel tank has been utilized as a place for mounting of the canister.

However, the disposition of the canister in back of the fuel tank as in the conventional manner results not only in a problem that the distance between the canister and the engine mounted at the front portion of the vehicle body is increased to lengthen a purge passage connecting the canister and the engine to each other, but also in a problem that the volume of a trunk room of the vehicle is reduced in order to ensure a space for mounting of the canister.

SUMMARY OF THE INVENTION

Accordingly, it is an object of the present invention to reasonably dispose the canister at the rear portion of the vehicle body while overcoming the above-discussed disadvantages of conventional systems.

To achieve the above object, according to a first aspect and feature of the present invention, there is provided an arrangement of disposition of a canister in a vehicle comprising a canister, a rear floor panel connected to a rear portion of a front floor panel through an upwardly rising connecting wall, and a fuel tank supported below the rear floor panel, wherein the canister is disposed between a rear surface of the connecting wall and a front surface of the fuel tank.

With the first feature of the present invention, it is possible to shorten the purge passage connected from the canister to the engine mounted at the front portion of the vehicle body, as compared with the case where the canister is disposed in rear of the fuel tank, and moreover to sufficiently ensure the volume of the trunk room provided in rear of the fuel tank. In addition, since the canister is surrounded by the rear floor panel, the connecting wall and the fuel tank, it is protected from the collision against a stepping stone, contact with a curbstone and the like.

According to a second aspect and feature of the present invention, in addition to the first feature, the canister is mounted to a front surface of a framework subframe which is detachably mounted to a vehicle body and supports the fuel tank.

With the second feature of the present invention, it is possible to reduce the number of vehicle assembling steps by mounting a subframe assembly including the canister onto the vehicle body.

According to a third aspect and feature of the present invention, in addition to the first feature, a cross member is secured to the rear surface of the connecting wall, and the canister is mounted to a rear surface of the cross member.

With the third feature of the present invention, it is possible to reliably support the canister by the cross member having a high rigidity.

According to a fourth aspect and feature of the present invention, in addition to the first feature, the canister and a muffler are juxtaposed in a lateral direction of a vehicle body.

With the fourth feature of the present invention, it is possible to effectively apply heat of the muffler to the canister to enhance the purging efficiency.

According to a fifth aspect and feature of the present invention, in addition to the first feature, the canister is formed longer in a widthwise direction of a vehicle body such as to extend along a front surface of the fuel tank.

With the fifth feature of the present invention, it is possible to sufficiently ensure the volume of the canister.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments with reference to the accompanying drawings.

Figure 1:
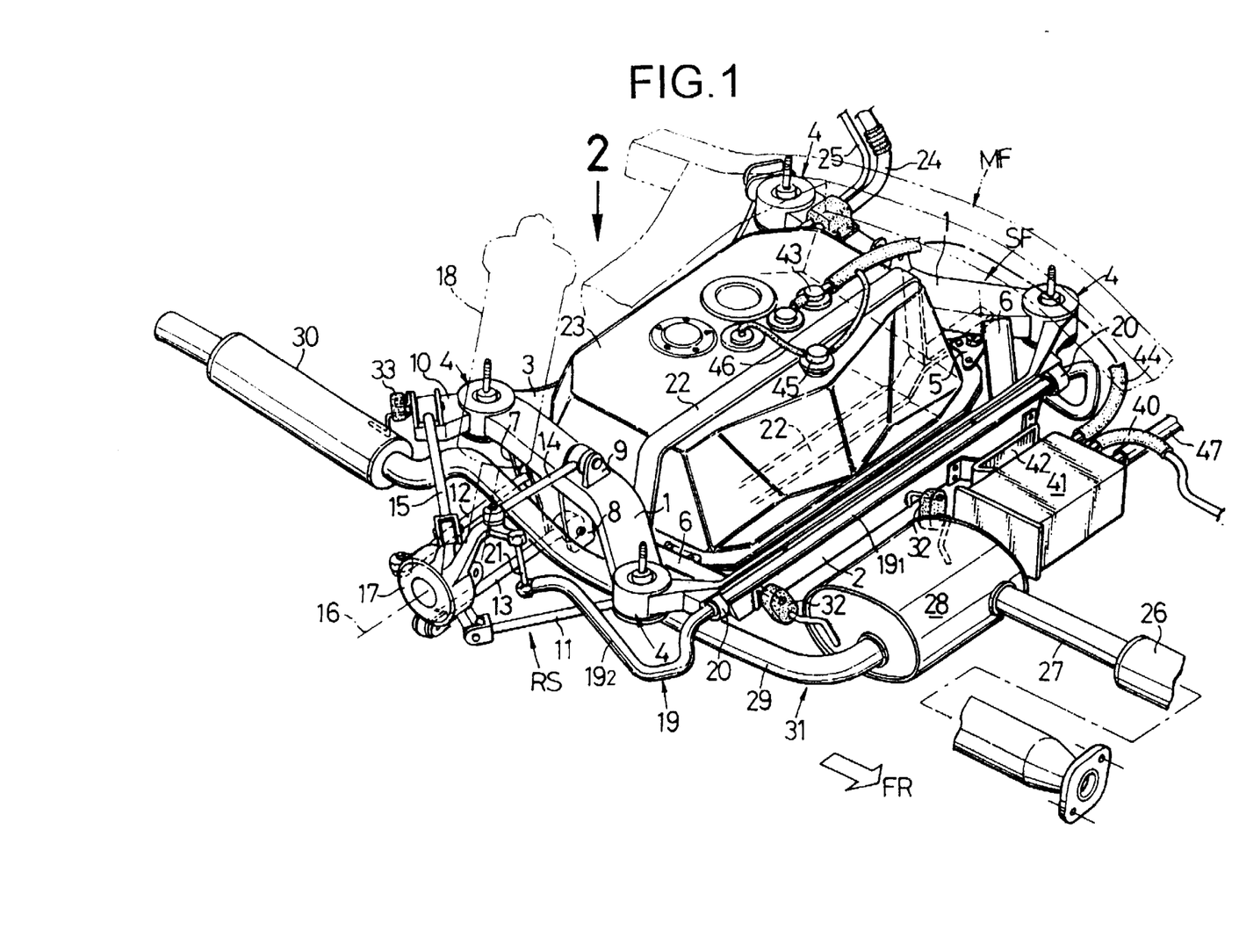
FIG. 1 is a perspective view of the entire subframe assembly to which a first embodiment of the present invention is applied.
Figure 2:
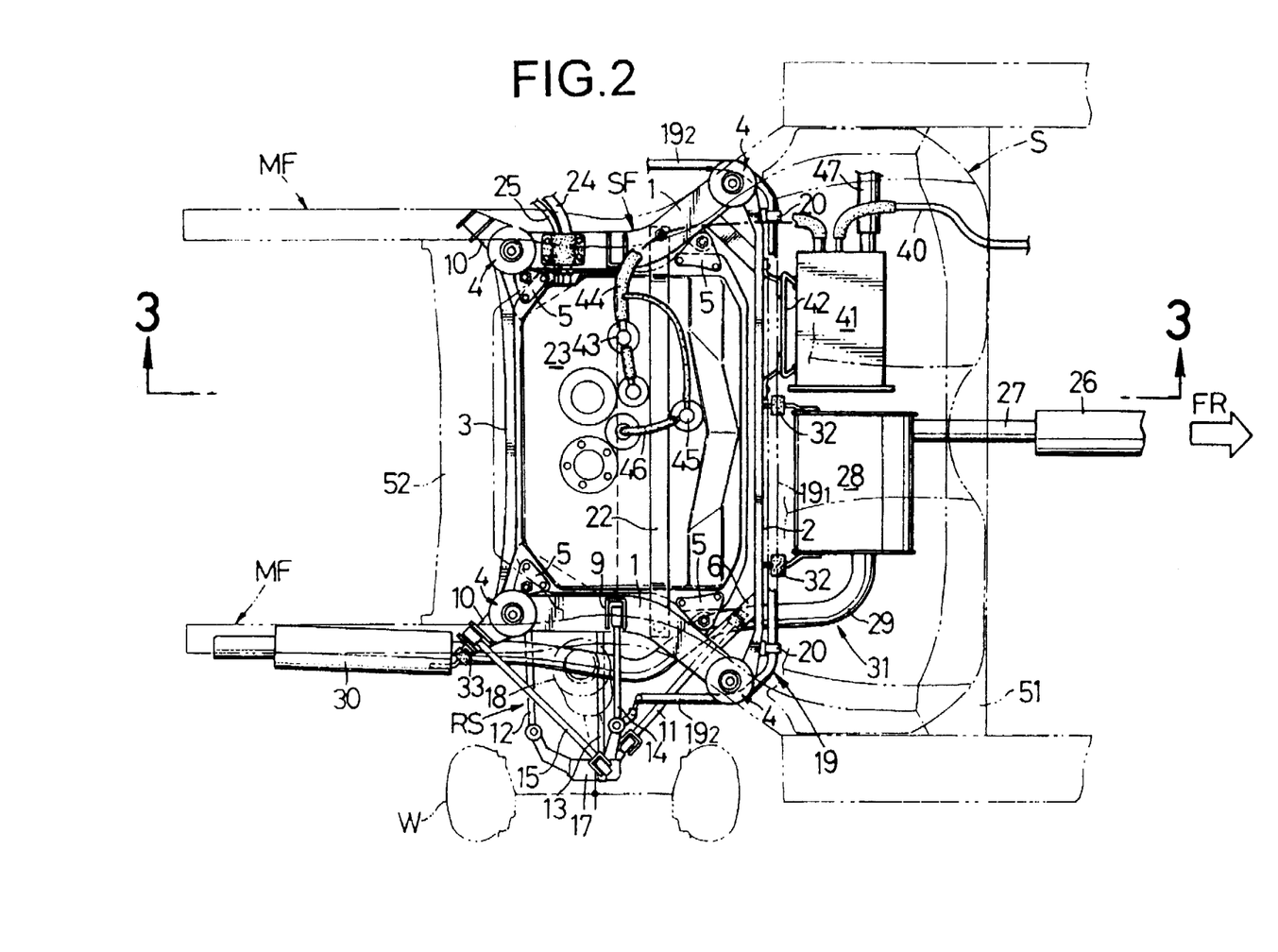
FIG. 2 is a plan view looking downwardly in a direction of arrow 2 in FIG. 1.
Figure 3:
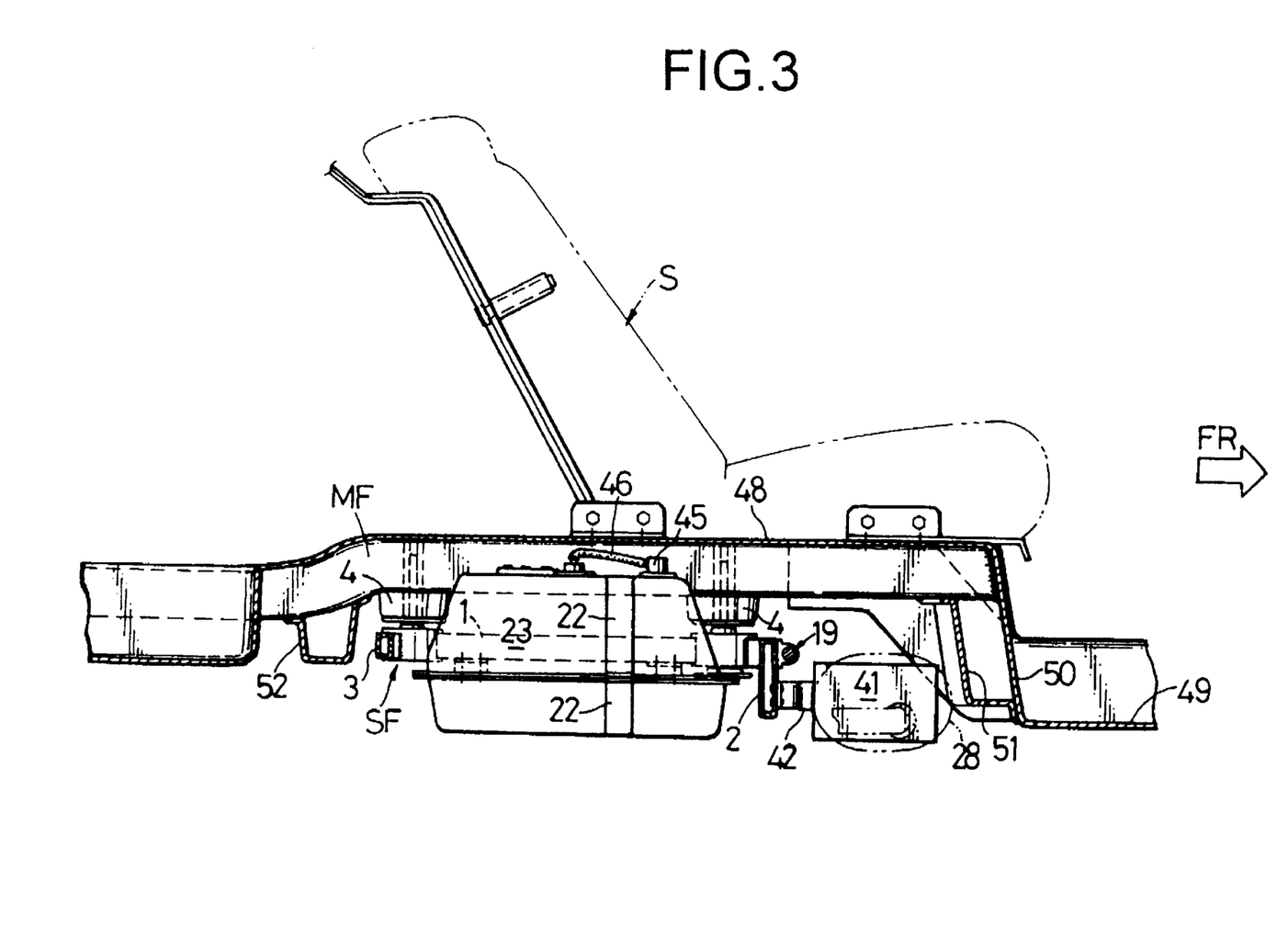
FIG. 3 is a sectional view taken along a line 3—3 in FIG. 2.

Referring to FIGS. 1 to 3 illustrating a first embodiment of the present invention, there is shown a subframe assembly including a framework subframe SF for supporting rear suspension RS, RS for suspending left and right rear wheels W, W of a front wheel drive vehicle. The subframe includes a pair of left and right side-members 1, 1, and a front cross-member 2 for connecting front ends of the side-members 1, 1, and a rear cross-member 3 for connecting rear ends of the side members 1, 1.

The front and rear ends of the side-members 1, 1 are coupled to outer casings of four rubber bush mounts 4, respectively, and left and right opposite ends of the front cross-member 2 extending in a lateral direction of a vehicle body are coupled to outer casings of the two front rubber bush mounts 4, 4. The front cross-member 2 is a member U-shaped in section and opened in its front surface. The opened portion of the front cross-member 2 is closed by reinforcing members $2_1$, $2_1$ in the vicinity of the left and right opposite ends excluding a central portion. Portions of the side-members 1, 1 near the front ends are coupled with portions of the front cross-member 2 near the left and right opposite ends by trailing arm brackets 6, 6 each U-shaped in section and opened in its lower surface, respectively.

The subframe SF is detachably supported on lower surfaces of a pair of main frames MF, MF extending on left and right opposite sides of the vehicle, through the four rubber bush mounts 4 provided at four corners.

The side-members 1, 1 and the front cross-member 2 are reinforced at around their coupled portions by the pair of trailing arm brackets 6, 6. A pair of controlling arm brackets 7, 7 are coupled at their upper ends to the two rear rubber bush mounts 4, 4, respectively. A pair of left and right lower arm brackets 8, 8 are coupled at their upper ends to lower surfaces of the side-members 1, 1 at locations displaced rearwardly from central portions of the side members. A pair of left and right upper arm brackets 9, 9 are mounted on upper surfaces of the side-members 1, 1 at central locations of the side members, and a pair of left and right leading arm brackets 10, 10 are mounted on rear surfaces of the rear two rubber bush mounts 4, 4.

Trailing arms 11, 11, control arms 12, 12, lower arms 13, 13, upper arms 14, 14 and leading arms 15, 15 of the rear suspensions RS, RS are connected to the trailing arm brackets 6, 6, the control arm brackets 7, 7, the lower arm brackets 8, 8, the upper arm brackets 9, 9 and the leading arm brackets 10, 10, respectively. Knuckles 17, 17 for supporting axles 16, 16 are connected to tip ends of the suspension arms, and the knuckles 17, 17 and the vehicle body are interconnected through dampers 18, 18.

A torsion portion $19_1$ of a stabilizer 19 is resiliently supported at its left and right opposite ends on a front surface of the front cross-member 2 through a pair of stabilizer supporting members 20, 20. A pair of arm portions $19_2$, $19_2$ extend rearwardly of the vehicle body from the left and right opposite ends of the torsion portion $19_1$, and have tip ends connected or the knuckles 17, 17 near upper arm-mounting portions of the knuckles 17, 17 through vertically extending stabilizer links 21, 21.

A fuel tank 23 is supported in a space defined by the side-members 1, 1, the front cross-member 2 and the rear cross-member 3, by means of two upper and lower bands 22, 22 fixed at their left and right opposite ends to the lower surfaces of the side-members 1, 1. Further, four corners of the fuel tank are fixed to the left and right side-members 1, 1 through triangular connecting members 5. By the fact that the fuel tank is supported within the subframe SF, it is possible not only to insure the volume of the fuel tank to the maximum, but also to protect the fuel tank by the subframe SF upon collision of the vehicle.

A filler pipe 24 and a breather pipe 25 extend from a left side of the fuel tank at its rear portion toward the outside of the vehicle body, and pass through between the upper surface of the left side-member 1 of the subframe SF and the lower surface of the left main frame MF to rise upwardly.

An exhaust system 31 is supported on the subframe SF and comprised of a front expansion chamber 26 which is detachably coupled to a rear end of an exhaust pipe extending from an engine, a from exhaust pipe 27, a main expansion chamber 28, a rear exhaust pipe 29 and a rear expansion chamber 30. The main expansion chamber 28 is supported in a hung manner on the front cross-member 2 with a pair of left and right resilient members 32, 32 interposed therebetween. The rear expansion chamber 30 is supported in a hung manner on the right leading arm bracket 10 with a resilient member 33 interposed therebetween.

A canister 41 is supported through a bracket 42 on a left half of the front surface of the front cross-member 2 such that the canister 41 adjoins a left side of the main expansion chamber 28 which is supported on a right half of the front surface of the front cross-member 2. The canister 41 and the inside of the fuel tank are interconnected through a first vent passage 44 which is provided at its intermediate portion with a solenoid valve 43. A portion of the first vent passage 44 between the canister 41 and the solenoid valve 43 is connected to the inside of the fuel tank a second vent passage 46 which is provided at its intermediate portion with a two-way valve 45. Further, a purge passage 40 connected to an intake system of the engine and a drain passage 47 which opens to the atmosphere are connected to the canister 41.

Thus, by opening the solenoid valve 43 during supplying of an oil to the fuel tank, an evaporated fuel forced out from the fuel tank 23 can be supplied to the canister through the first vent passage 44, where it can be absorbed to activated carbon and thus prevented from being released to the atmosphere. When the temperature of the fuel tank is risen during parking of the vehicle or the like, the evaporated fuel generated within the fuel tank can be supplied to the canister 41 through the second vent passage 46 and the first vent passage 44 by opening the two-way valve 45 by a difference in pressure from the atmosphere. The evaporated fuel purged from the canister 41 during operation of the engine is supplied to the intake system of the engine through the purge passage 40, where it is mixed with an air-fuel mixture and then put into combustion.

As can be seen from FIG. 3, a floor panel assembly of the vehicle body is comprised of a rear floor panel 48 disposed between the upper surfaces of the left and right main frames MF, MF for supporting a rear seat S on its upper surface, a front floor panel 49 disposed at a location lower than and in front of the rear floor panel 48, and a connecting wall 50 extending substantially vertically and connecting a front end of the rear floor panel 48 and a rear end of the front floor panel 49. In this embodiment, the front floor panel 49, the connecting wall 50 and the rear floor panel 48 are integral with one another. Alternatively, the connecting wall 50 and the rear floor panel 48 may be formed integrally with each other, and they may be welded to the front floor panel 49, according to conventional practice. In front of the subframe SF, a rear surface of the connecting wall 50 is reinforced by a middle floor cross-member 51 extending in a lateral direction of the vehicle body, while in rear of the subframe SF, the lower surfaces of the left and right main frames MF, MF are reinforced by a rear floor cross-member 52 extending in the lateral direction of the vehicle body.

A predetermined distance is provided between the front surface of the fuel tank and a rear surface of the middle cross-member 51. As a result, a space is defined and surrounded at three sides by the front surface of the fuel tank, a lower surface of the rear floor panel 48 and the rear surface of the middle cross-member 51, and the canister 41 and the main expansion chamber 28 are laterally juxtaposed so as to be accommodated in the space. The space can be effectively utilized to sufficiently ensure the volume of the canister 41 by forming the canister 41 longer in the lateral direction of the vehicle body and by disposing the canister 41 along the front surface of the fuel tank.

By the disposition of the canister 41 in front of the fuel tank in the above manner, it is possible not only to shorten the entire length of the purge passage 40 connected to the engine mounted at the front portion of the vehicle body, but also the volume of a trunk room provided in back of the fuel tank is not affected or reduced by the canister 41. In addition, the canister 41 is protected from collision against a stepping stone, contact with a curbstone and the like by the fuel tank and the middle floor cross-member 51.

Further, since the canister 41 and the main expansion chamber 28 are juxtaposed in the tunnel-like space surrounded at the three sides by the front surface of the fuel tank, the lower surface of the rear floor panel 48 and the rear surface of the middle cross-member 51, heat emanating from the main expansion chamber 28, which has been heated by passing of exhaust gas therethrough, can be effectively applied to the canister 41. As a result, the purging efficiency of the canister 41 is enhanced and hence, the volume of the activated carbon can be reduced and the canister 41 can be reduced in size.

A subframe assembly made by integrally assembling the left and right rear suspensions RS, RS, the fuel tank, the exhaust system 31 and the canister 41 is mounted to the pair of left and right main frames MF, MF with the front and rear, left and right four rubber bush amounts 4 interposed therebetween. In this case, the number of assembling steps can be substantially reduced by previously subassembling the subframe assembly as a unit and then mounting it on the main frames MF, MF.

Figure 4:
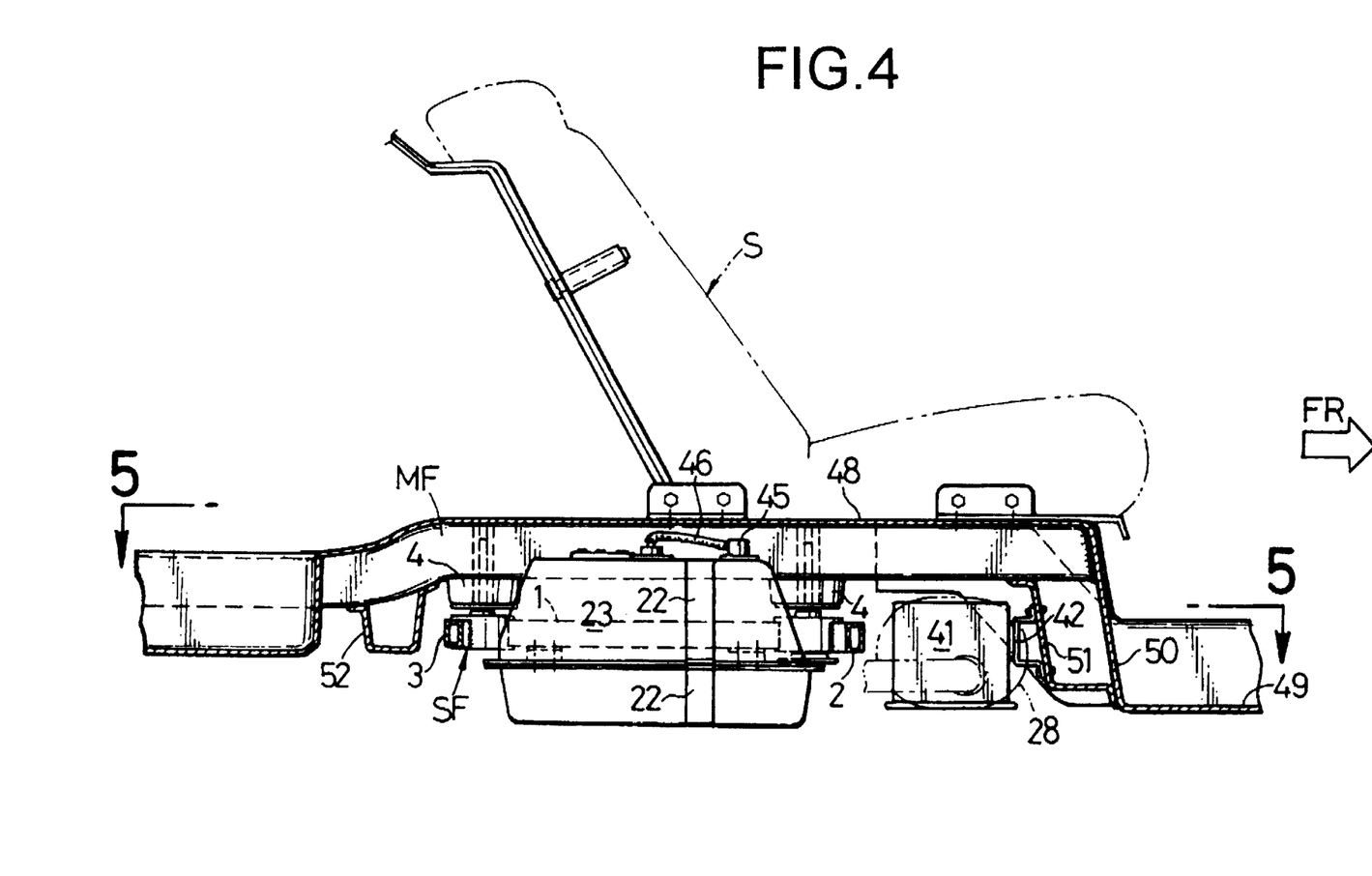
FIG. 4 is a sectional view similar to FIG. 3, but illustrating a second embodiment and taken along a line 4—4 in FIG. 5.
Figure 5:
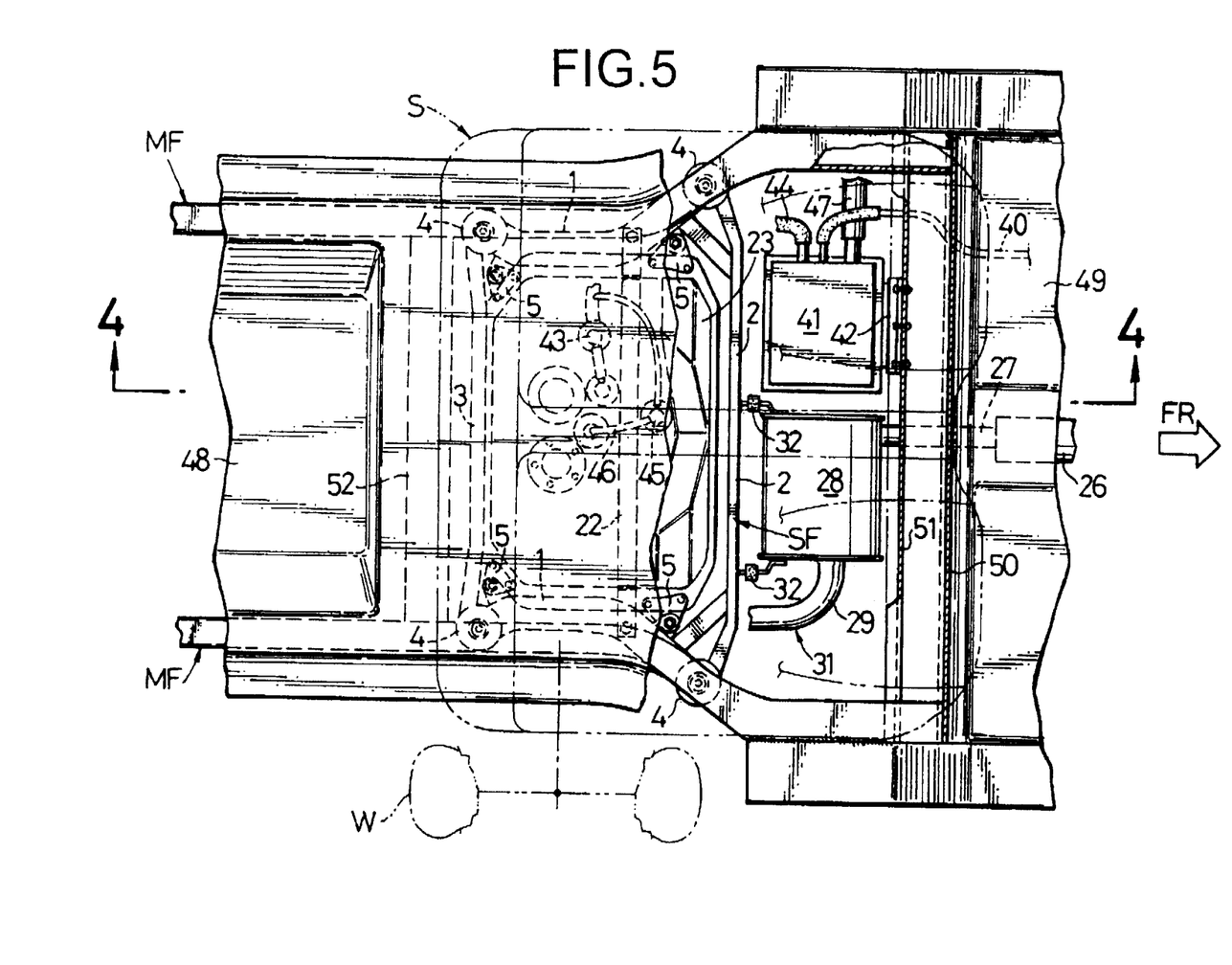
FIG. 5 is a sectional view taken along a line 5—5 in FIG. 4.

A second embodiment of the present invention will now be described with reference to FIGS. 4 and 5. In this second embodiment, members and components corresponding to those in the first embodiment are designated by like reference characters.

The second embodiment is different from the first embodiment in respect of the mounted position of the canister 41. More specifically, the middle floor cross-member 51 is secured to the rear surface of the connecting wall 50 which connects the front floor panel 49 with the rear floor panel 48, and the canister 41 is mounted to the rear surface of the middle floor cross-member 51 with a bracket 42 interposed therebetween. The middle floor cross-member 51 is a member having a satisfactory rigidity and hence, even when the canister 41 has a large weight, it can be reliably supported on the middle floor cross-member 51.

The canister 41 and the main expansion chamber 28 are juxtaposed in a tunnel-like space surrounded at its three sides by the front surface of the fuel tank, the lower surface of the rear floor panel 48 and the rear surface of the middle floor cross-member 51. Therefore, it is possible to achieve functional effects of shortening the purge passage 40 connected to the engine, protecting the canister 41, ensuring the volume of a trunk room and enhancing the purging efficiency of the canister 41 just as in the first embodiment.

Although the preferred embodiments of the present invention have been described in detail, it will be understood that the present invention is not limited to the above-described embodiments, and various modifications in design may be made without departing from the spirit and scope of the invention defined in claims.

For example, the canister 41 may be mounted to the lower surface of the rear floor panel 48, or may be mounted to the rear surface of the connecting wall 50 without the middle floor cross-member interposed therebetween. The canister 41 and the main expansion chamber 28 may be disposed in a laterally inverted relation from that in the embodiments, etc.

What is claimed:

1. An arrangement of disposition of a canister in a vehicle, the arrangement comprising a canister, a rear floor panel connected to a rear portion of a front floor panel through an upwardly rising connecting wall, and a fuel tank supported below said rear floor panel, wherein said canister is disposed between a rear surface of said connecting wall and a front surface of said fuel tank.

2. An arrangement of disposition of a canister in a vehicle according to claim 1, wherein said canister is mounted to a front surface of a framework subframe which is detachably mounted to a vehicle body and supports said fuel tank.

3. An arrangement of disposition of a canister in a vehicle according to claim 1, further including a cross member secured to the rear surface of said connecting wall, said canister being supported on a rear surface of said cross member.

4. An arrangement of disposition of a canister in a vehicle according to claim 1, wherein said canister and a muffler are juxtaposed in a lateral direction of a vehicle body.

5. An arrangement of disposition of a canister in a vehicle according to claim 1, wherein a longest dimension of said canister extends in a widthwise direction of a vehicle body along a front surface of said fuel tank.

6. An arrangement of disposition of a canister in a vehicle according to claim 1, wherein said canister has an evaporated fuel adsorbent therein, and said canister is in fluid communication with said fuel tank and intake system for a vehicle engine.

7. An arrangement of disposition of a canister in a vehicle according to claim 1, wherein said canister is disposed in a space defined and surrounded at three sides by the front surface of said fuel tank, a rear surface of said connecting wall, and a lower surface of said rear floor panel.

8. An arrangement of disposition of a canister in a vehicle, according to claim 7, wherein said canister and a muffler of the vehicle are juxtaposed in the lateral direction of the vehicle body within said space.

9. An arrangement of disposition of a canister in a vehicle according to claim 1, wherein said canister is disposed in close proximity to said front surface of said fuel tank.

10. An arrangement of disposition of an evaporated fuel absorbing canister in a vehicle according to claim 1, wherein said canister is disposed in an open space bounded by the rear surface of the connecting wall and the front surface of the fuel tank.

11. An arrangement of disposition of a canister in a vehicle according to claim 1, wherein said fuel tank is disposed laterally between rear wheels of the vehicle.

12. An arrangement of disposition of an evaporated fuel absorbing canister in a vehicle, comprising:

a floor panel having a substantially vertical intermediate section connecting front and rear sections;

the fuel tank disposed below a the rear section of said floor panel such that a front surface of the fuel tank faces a rear surface of said intermediate section of the floor panel with a space therebetween; and an evaporated fuel absorbing canister operatively connected to said fuel tank and disposed within said space.

13. A arrangement of disposition of a canister in a vehicle according to claim 12, wherein said space is bounded at an upper end thereof by the rear section of said floor panel, said space extends laterally of the vehicle, and a muffler of an exhaust system of the vehicle is juxtaposed with said canister in said space.

14. A arrangement of disposition of a canister in a vehicle according to claim 12, wherein a longest dimension of said canister extends laterally of said vehicle.

15. An arrangement of disposition of a canister in a vehicle according to claim 12, wherein knuckles for rear wheels of the vehicle are disposed laterally of said fuel tank, and said space is defined by a front surface of said fuel tank and disposed forwardly of said knuckles.

16. An arrangement of disposition of a canister in a vehicle according to claim 12, wherein said fuel tank is supported on a subframe which is detachably mounted to a vehicle body, and said canister is mounted to a front surface of the subframe.

17. An arrangement of disposition of a canister in a vehicle according to claim 12, further including a cross member secured to a rear surface of said intermediate section of the floor panel, and said canister is mounted to said cross member.

18. An arrangement of disposition of a canister in a vehicle according to claim 12, wherein said canister is disposed in close proximity to said front surface of fuel tank.

19. An arrangement of disposition of a canister in a vehicle according to claim 12, wherein said canister is disposed in an open space bounded by the front surface of the fuel tank and the intermediate section of the floor panel.

20. An arrangement of disposition of a canister according to claim 12, wherein said fuel tank is disposed laterally between rear wheels of the vehicle.

* * * * *

UNITED STATES PATENT AND TRADEMARK OFFICE
CERTIFICATE OF CORRECTION

PATENT NO.   : 5,702,125
DATED        : December 30, 1997
INVENTOR(S)  : Takeaki Nakajima, Kazumi Yamazaki It is certified that error appears in the above-indentified patent and that said Letters Patent is hereby corrected as shown below:

Column 1, line 6, change "arrangements" to --arrangement--.

Column 3, line numbered between 33 & 34, change "fight" to --right--;
         line numbered between 35 & 36, change "or" to --to--;
         line 58, change "from" to --front--.

Column 4, 8th line, after "tank" insert --through--;
         line numbered approximately 44, change "fight" to --right--.

Column 6, line numbered between 41 & 42, change "the fuel" to
    --a fuel--; after "below" delete "a".

Column 7, line 6, before "fuel" insert --the--.

Signed and Sealed this

Seventeenth Day of March, 1998

Attest:

BRUCE LEHMAN

Attesting Officer

Commissioner of Patents and Trademarks